United States Patent
Kwon (10) Patent No.: US 7,421,146 B2
(45) Date of Patent: Sep. 2, 2008

(54) APPARATUS AND METHOD OF PROCESSING SHOOT ARTIFACTS OF IMAGE SIGNALS

(75) Inventor: Young-Jin Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 630 days.

(21) Appl. No.: 11/149,203

(22) Filed: Jun. 10, 2005

(65) Prior Publication Data

US 2006/0045376 A1 Mar. 2, 2006

(30) Foreign Application Priority Data

Aug. 26, 2004 (KR) .................. 10-2004-0067367

(51) Int. Cl.
*G06K 9/40* (2006.01)

(52) U.S. Cl. .................. 382/275; 382/260; 382/274; 382/298; 358/3.26; 358/3.27; 358/463

(58) Field of Classification Search .................. 382/260, 382/274, 275, 298; 358/3.26, 3.27, 463
See application file for complete search history.

(56) References Cited

U.S. PATENT DOCUMENTS

| | | | |
|---|---|---|---|
| 5,828,776 A | * | 10/1998 | Lee et al. .................. 382/133 |
| 6,707,487 B1 | * | 3/2004 | Aman et al. ................. 348/169 |
| 6,782,287 B2 | * | 8/2004 | Grzeszczuk et al. ......... 600/424 |
| 6,847,391 B1 | * | 1/2005 | Kassatly .................. 348/14.01 |
| 7,049,074 B2 | * | 5/2006 | Schwartz ....................... 435/6 |

FOREIGN PATENT DOCUMENTS

| | | |
|---|---|---|
| JP | 2000-324364 | 11/2000 |
| JP | 2003-189128 | 7/2003 |
| JP | 2003-198878 | 7/2003 |
| JP | 2003-348380 | 12/2003 |

* cited by examiner

*Primary Examiner*—Yosef Kassa
(74) *Attorney, Agent, or Firm*—Stanzione & Kim, LLP

(57) ABSTRACT

An apparatus and method of processing shoot artifacts of an image signal includes a maximum gradient value calculation part to set a window of a predetermined size based on a current pixel of an input image signal and to calculate a maximum gradient value based on values of pixels in the window, a limit value calculation part to calculate a limit value corresponding to the maximum gradient value, a dilation amount calculation part to calculate a dilation amount corresponding to the current pixel based on the calculated limit value and a pixel difference between the current pixel neighboring pixels of the current pixel, and a pixel value conversion part to add a current pixel value to a value obtained by multiplying the calculated dilation amount by a predetermined gain value.

36 Claims, 5 Drawing Sheets

APPARATUS AND METHOD OF PROCESSING SHOOT ARTIFACTS OF IMAGE SIGNALS

CROSS-REFERENCE TO RELATED APPLICATIONS

This application claims benefit under 35 U.S.C. §119 from Korean Patent Application No. 2004-67367, filed on Aug. 26, 2004, with the Korean Intellectual Property Office, the content of which is incorporated herein in its entirety and by reference.

BACKGROUND OF THE INVENTION

1. Field of the Invention

The present general inventive concept relates generally to an artifact-processing apparatus. More particularly, the present general inventive concept relates to an apparatus and method of processing shoot artifacts of image signals to reduce the shoot artifacts appearing when the image signals are compressed or pass through bandwidth-limited transmission lines.

2. Description of the Related Art

Artifacts appear due to a reduction of high-frequency components when an image signal goes through lossy compression or bandwidth-limited transmission lines. The artifacts that cause a phenomenon of seemingly overlapped white-colored ripples around edges of the image are called 'shoot artifacts'.

The shoot artifacts become prominent on the edges of images in which brightness values greatly change as the sharpness of the images having such shoot artifacts is enhanced, and cause the images to appear unnatural.

A conventional scheme for suppressing such shoot artifacts is disclosed in U.S. Pat. No. 6,668,097 B1, the description of which will not be made in detail in here.

In brief, the U.S. Pat. No. 6,668,097 B1 has a problem of no consideration of shoot artifacts appearing on the edges not exceeding a particular threshold value, and suppressing only the shoot artifacts of the edges exceeding the particular threshold value. Furthermore, in regions in which the shoot artifacts are determined to appear, the U.S. Pat. No. 6,668,097 B1 suppresses the shoot artifacts using a 'gray level opening' and a 'gray level closing,' which causes a problem of truncating components of detailed images.

SUMMARY OF THE INVENTION

The present general inventive concept provides an apparatus and method of processing shoot artifacts of an image signal by suppressing the shoot artifacts occurring when the image signal is compressed or the image signal passes through bandwidth-limited transmission lines with dilation applied to the image signal with respect to local characteristics of the image signal.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept may be achieved by providing an apparatus to process shoot artifacts of an image signal, the apparatus comprising a maximum gradient value calculation part to set a window of a predetermined size based on a current pixel of an input image signal and to calculate a maximum gradient value based on values of pixels in the window, a limit value calculation part to calculate a limit value corresponding to the maximum gradient value, a dilation amount calculation part to calculate a dilation amount corresponding to the current pixel based on the calculated limit value and a pixel difference between the current pixel and neighboring pixels of the current pixel, and a pixel value conversion part to add a current pixel value of the current pixel to a value obtained by multiplying the calculated dilation amount by a predetermined gain value.

The foregoing and/or other aspects and advantages of the present general inventive concept may also be achieved by providing a method of processing shoot artifacts of an image signal, the method comprising setting a window of a predetermined size based on a current pixel of an input image signal and calculating a maximum gradient value based on values of pixels in the window, calculating a limit value corresponding to the maximum gradient value, calculating a dilation amount corresponding to the current pixel based on the calculated limit value and a pixel difference between the current pixel and neighboring pixels of the current pixel, and adding a current pixel value to a value obtained by multiplying the calculated dilation amount by a predetermined gain value.

The calculating of the maximum gradient value may include calculating pixel differences between neighboring pixels of plural pixels in the window, and selecting a maximum value of the calculated pixel differences.

The dilation amount may be proportional to an edge size of the input image signal.

The gain value may be adjustable by a user.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1A:
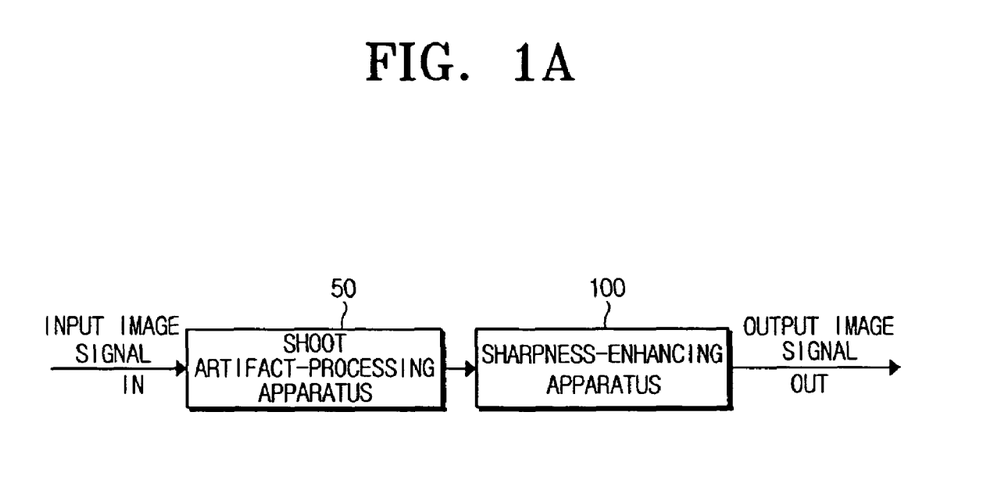
FIG. 1A and FIG. 1B are views illustrating a shoot artifact-processing apparatus according to an embodiment of the present general inventive concept located in a general image-processing system.
Figure 1B:
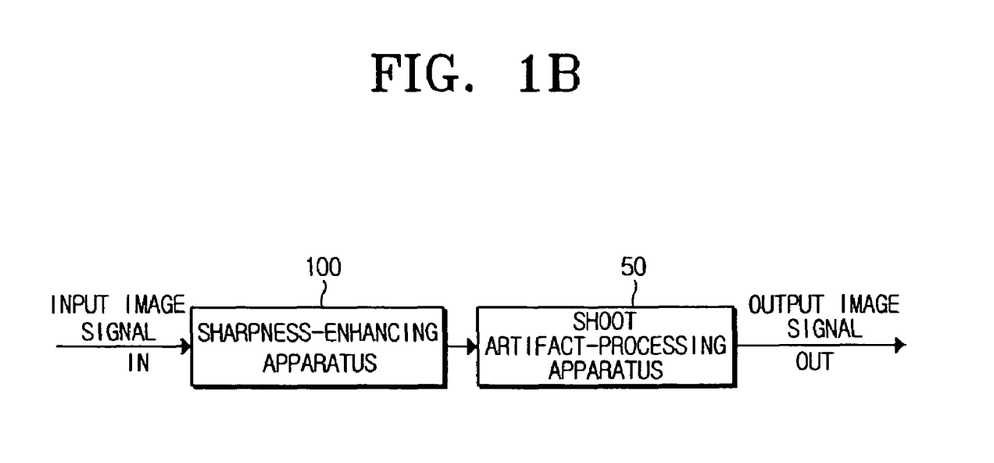

FIG. 1A and FIG. 1B are views illustrating a shoot artifact-processing apparatus 50 located in an image-processing system according to an embodiment of the present general inventive concept. Referring to FIGS. 1A and 1B, a sharpness-enhancing apparatus 100 can be used to enhance a sharpness of fine parts of an image during image processing to reproduce the image more vividly.

Referring to FIG. 1A, the shoot artifact-processing apparatus 50 can be placed before the sharpness-enhancing apparatus 100. In this case the shoot artifact-processing apparatus 50 suppresses shoot artifacts existing in an input image signal, and the sharpness-enhancing apparatus 100 enhances the sharpness of the input image signal processed by the shoot-artifact processing apparatus 50 and outputs an output image signal. Referring to FIG. 1B, the shoot artifact-processing apparatus 50 can be located after the sharpness-enhancing apparatus 100. In this case, the sharpness-enhancing apparatus 100 enhances the sharpness of the input image signal, and the shoot artifact-processing apparatus 50 suppresses the shoot artifacts prominent in the input image signal processed by the sharpness-enhancing apparatus 100 and outputs the output image signal.

Figure 2:
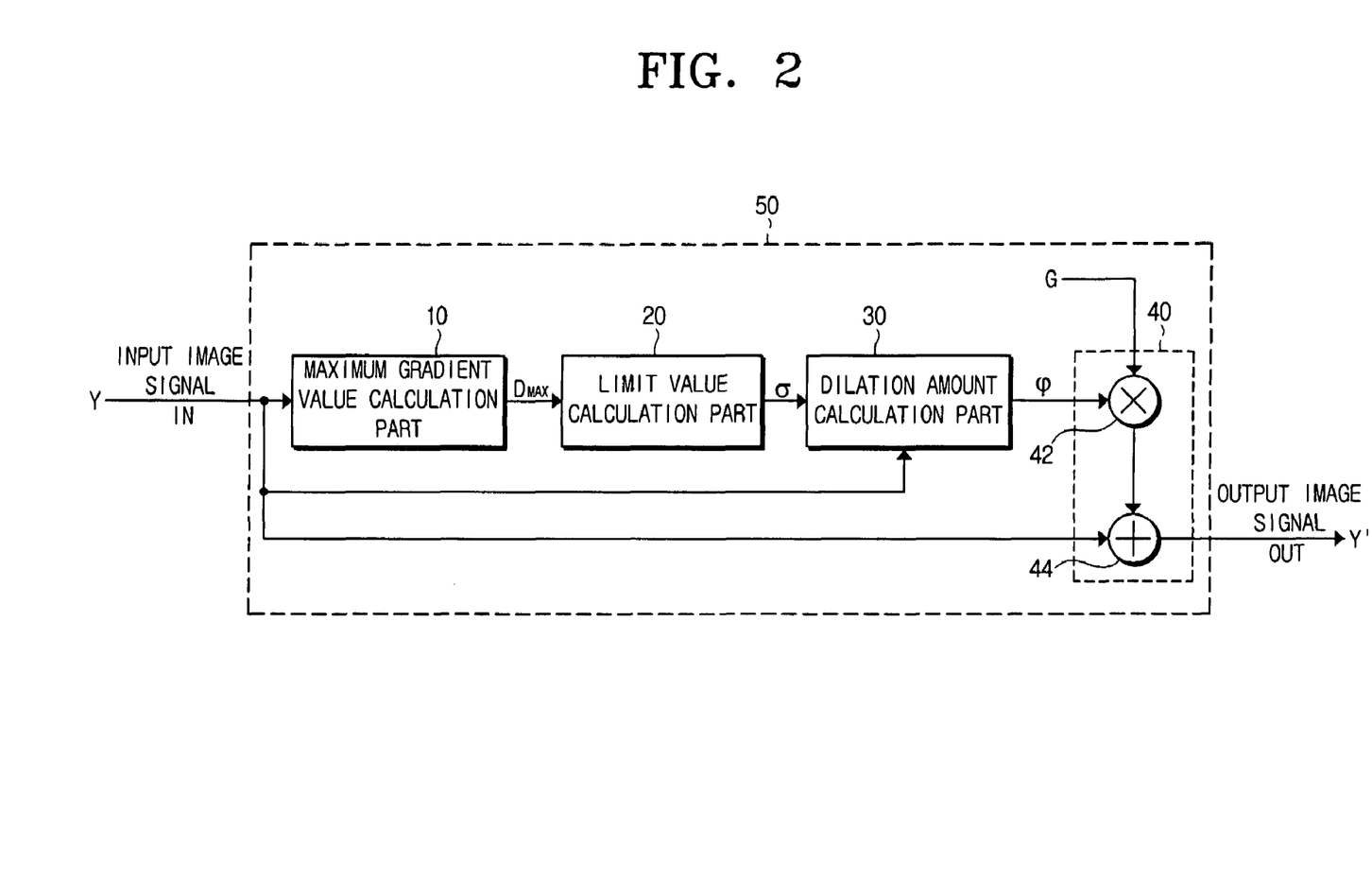
FIG. 2 is a block diagram illustrating a structure of the shoot artifact-processing apparatus of FIG. 1.

FIG. 2 is a block diagram illustrating the shoot artifact-processing apparatus 50 of FIGS. 1A and 1B. Referring to FIG. 2, the shoot artifact-processing apparatus 50 has a maximum gradient value calculation part 10, a limit value calculation part 20, a dilation amount calculation part 30, and a pixel value conversion part 40.

The maximum gradient value calculation part 10 sets a window of a predetermined size with respect to a current pixel of an input image signal, and calculates a maximum gradient value in a scope of the window. Gradient values are calculated based on luminance value differences between neighboring pixels in the window, and the shoot artifacts mainly occur at points having large gradient values, that is, having large luminance value differences between the neighboring pixels. The maximum gradient value calculation part 10 calculates the luminance value differences between the neighboring pixels in the window, and calculates the maximum gradient value by selecting one of the calculated luminance value differences which has a maximum value.

The limit value calculation part 20 calculates a limit value based on the maximum gradient value calculated by the maximum gradient value calculation part 10. The limit value can be designed to have a linearly proportional relationship to the maximum gradient value, but can have a sine-function or a cosine-function relationship depending on a preference of a designer.

The dilation amount calculation part 30 performs low-pass filtering based on the limit value calculated by the limit value calculation part 20 and a pixel difference (i.e. luminance value difference) between the current pixel and neighboring pixels of the current pixel, and then calculates a dilation amount corresponding to the current pixel.

The pixel value conversion part 40 converts a current value of the current pixel of the input image signal into an output pixel value based on a predetermined gain value G and the dilation amount corresponding to the current pixel calculated by the dilation amount calculation part 30, and outputs the output pixel value in an output image signal. The pixel value conversion part 20 can comprise a multiplier 42 to multiply the dilation amount calculated by the dilation amount calculation part 30 and the gain value G together to determine a multiplication value, and an adder 44 to add the multiplication value to the current value of the current pixel to determine the output pixel value. The gain value G can be adjustable by a user.

Figure 3:
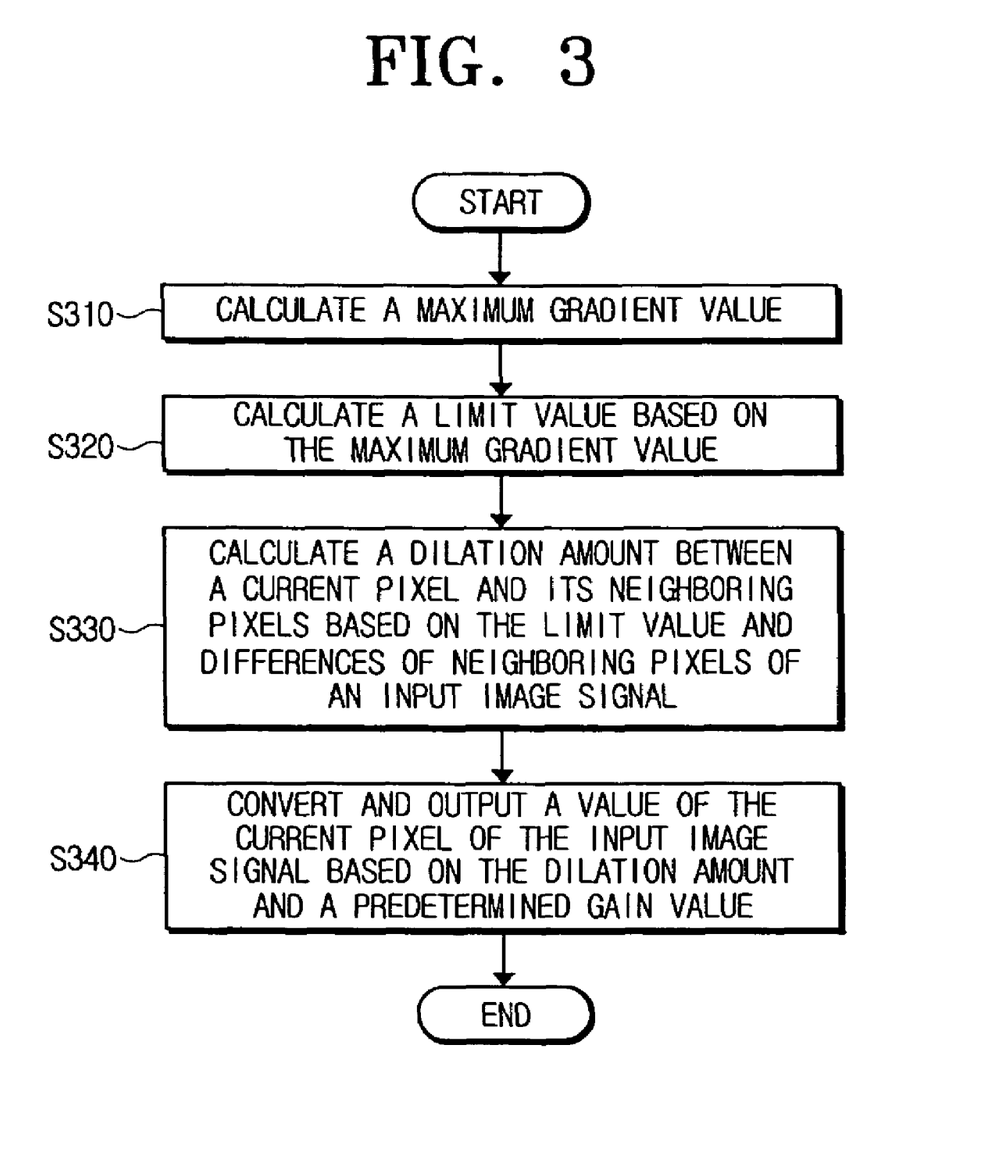
FIG. 3 is a flowchart illustrating a shoot artifact-processing method of image signals according to an embodiment of the present general inventive concept.

FIG. 3 is a flowchart illustrating a method of processing shoot artifacts of an input image signal according to an embodiment of the present general inventive concept. Referring to FIG. 2 and FIG. 3, first, the maximum gradient value calculation part 10 sets the window of the predetermined size with respect to the current pixel of the input image signal, and calculates the maximum gradient value in the scope of the window (S310).

The gradient values based on differences of the pixel values (i.e. the luminance values) among the neighboring pixels in the window are calculated, and the maximum gradient value calculation part 10 selects the maximum value of the calculated gradient values.

The above process can be expressed in Equation 1 as below:

$$D_{MAX}=\text{Max}(|P_0-P_1|,|P_1-P_2|,|P_2-P_3|,0,|P_{n-1}-P_n|) \quad \text{[Equation 1]}$$

In Equation 1, $D_{MAX}$ indicates the maximum gradient value, $P_0 \sim P_n$ the pixel values of the pixels in the window, and Max( ) a maximum-value function.

As in Equation 1, the maximum gradient value calculation part 10 calculates the pixel differences between neighboring pixels in the window, and calculates the maximum gradient value by selecting the maximum value out of the pixel differences calculated by the maximum-value function.

The limit value calculation part 20 calculates the limit value based on the maximum gradient value calculated by the maximum gradient value calculation part 10 (S320).

Figure 4A:
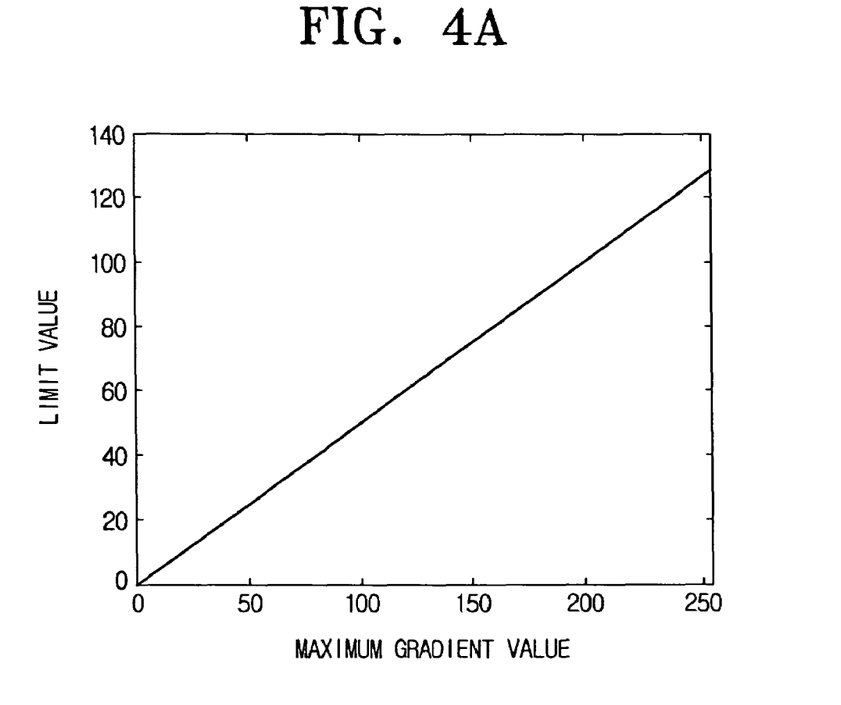
FIGS. 4A and 4B are graphs illustrating limit values varying with maximum gradient values.
Figure 4B:
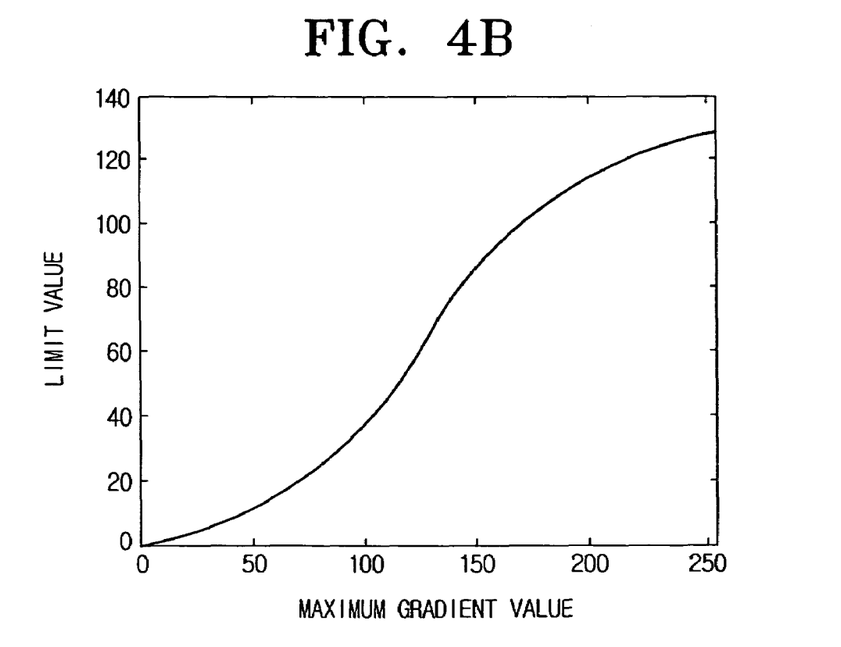

FIGS. 4A and 4B are graphs illustrating the limit value varying with respect to the maximum gradient value. Referring to FIG. 4A, the graph represents an example in which the limit value increase as the maximum gradient value increase, in order to suppress general shoot-artifact characteristics.

The Equation 2 below shows the relationship of the limit values and the maximum gradient values of the graph of FIG. 4A.

$$\sigma=k_1 D_{MAX} \quad \text{[Equation 2]}$$

In Equation 2, σ indicates the limit value, $D_{MAX}$ the maximum gradient value, and $k_1$ an arbitrary constant.

Meanwhile, the graph of FIG. 4B represents an example in which the limit values are designed to become much smaller in a region having small maximum gradient values and much larger in a region having large maximum gradient values in order to decrease an effect of the suppression of the shoot-artifacts on regions with dense texture (i.e. the regions having the small maximum gradient values and therefore, are less likely to be effected by shoot-artifacts).

Equation 3 below shows the relationship of the limit values and the maximum gradient values of graph (b) of FIG. 4.

$$\sigma=K_2(1-\cos(2\pi f D_{MAX})) \quad \text{[Equation 3]}$$

In Equation 3, σ indicates the limit value, $D_{MAX}$ the maximum gradient value, and $K_2$ an arbitrary constant.

The limit value σ calculated in the limit value calculation part 20 is used as a maximum limit value to which the low-pass filtering is applied when the dilation amount calculation part 30 performs the low-pass filtering, which is the same as the bandwidth of a low-pass filter.

The dilation amount calculation part 30 performs the low-pass filtering based on the limit value σ calculated in the limit value calculation part 20 and the pixel difference between the current pixel and the neighboring pixels of the current pixel, and calculates the dilation amount corresponding to the current pixel (S330).

Equation 4 expresses the dilation amount corresponding to the current pixel calculated in the dilation amount calculation part 30.

$$\phi(x, \sigma) = \begin{bmatrix} x\left[1 - \left(\frac{x}{\sigma}\right)^2\right]^2 & |x| \le \sigma \\ 0 & \text{otherwise} \end{bmatrix} \quad \text{[Equation 4]}$$

In Equation 4, $\phi(x, \sigma)$ indicates the dilation amount corresponding to the current pixel, x the pixel difference between the current pixel and the neighboring pixels of the current pixel, and $\sigma$ the limit value.

As shown in Equation 4, the dilation amount calculation part 30 calculates a dilation amount $\phi$ corresponding to the current pixel by applying the low-pass filtering only when the pixel difference x between the current pixel and the neighboring pixels of the current pixel is smaller than the calculated limit value $\sigma$, and, if the pixel difference x between the current pixel and the neighboring pixels of the current pixel is larger than the calculated limit value $\sigma$, the pixel difference x between the current pixel and the neighboring pixels of the current pixel having the value larger than the limit value $\sigma$ is not considered when the dilation amount corresponding to the current pixel is calculated. That is, if the pixel difference x between the current pixel and the neighboring pixels of the current pixel is larger than the calculated limit value $\sigma$, the dilation amount $\phi$ corresponding to the current pixel between pixels becomes zero.

Figure 5A:
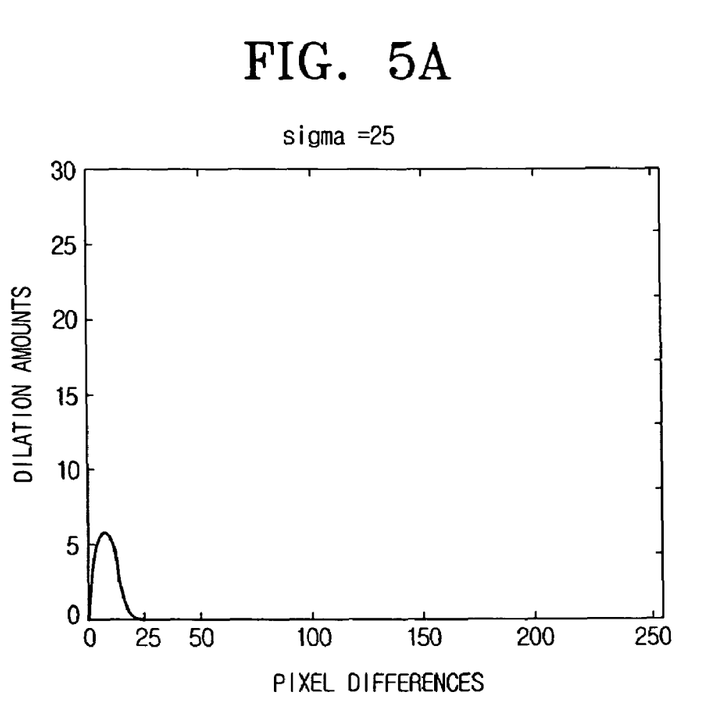
FIGS. 5A and 5B are graphs illustrating relationships of pixel differences and dilation amounts between pixels as limit values vary.
Figure 5B:
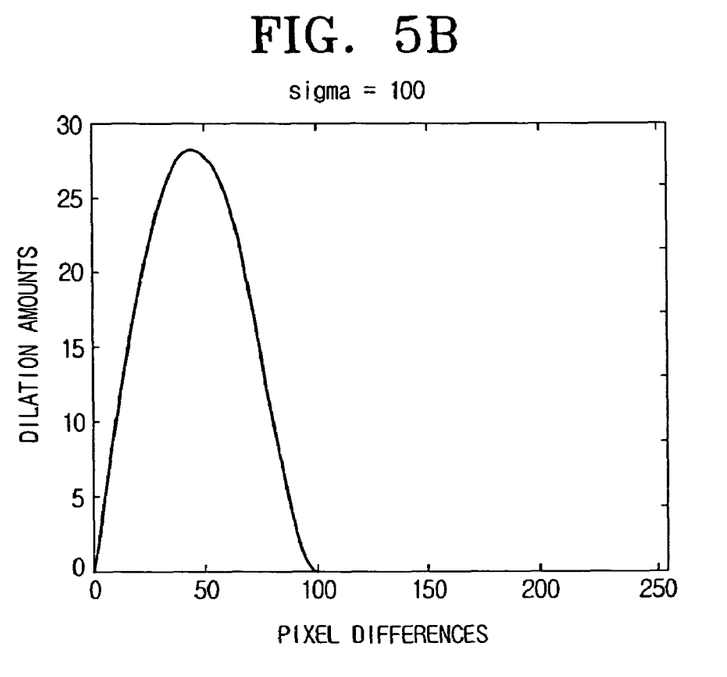

FIGS. 5A and 5B are graphs illustrating relationships of the pixel difference x and the dilation amount $\phi$ as the limit value $\sigma$ varies.

The graph of FIG. 5A represents an example in which the dilation amount $\phi$ has a peak value at a point where the pixel difference x is 5 when the limit value is 25, and the graph of FIG. 5B represents an example in which the dilation amount $\phi$ has a peak value at the point where the pixel difference x is 50 when the limit value $\sigma$ is 100.

Comparing the graphs of FIGS. 5A and 5B, the dilation amount calculation part 30 calculates a small dilation amount with respect to pixels having small limit values and pixel values similar to neighboring pixels, and calculates a large dilation amount with respect to pixels having large limit values and pixel values different from neighboring pixels. That is, the dilation amount can be proportional to the limit values. The limit value has the proportional relationship, such as a linear, a sine, or a cosine relationship, to the maximum gradient value, so that the dilation amount can have a proportional relationship to the maximum gradient value. Furthermore, since the gradient value can be proportional to an edge size of an image represented by the input image signal, the dilation amount can also be proportional to the edge size.

The pixel value conversion part 40 converts the current value of the current pixel of the input image signal into the output pixel value based on the predetermined gain value and the dilation amount corresponding to the current pixel calculated by the dilation amount calculation part 30 (S340), and outputs the output pixel value in the output image signal.

That is, the multiplier 42 of the pixel value conversion part 40 multiplies the dilation amount $\phi$ calculated by the dilation amount calculation part 30 and the predetermined gain value G together, and provides a multiplication value to the adder 44. The adder 44 adds the multiplication value input from the multiplier 42 to the current value of the current pixel of the input image signal to determine the output pixel value of the output image signal, which can be expressed in Equation 5 as below.

$$Y' = Y + \phi \cdot G \quad \text{[Equation 5]}$$

In FIGS. 5A and 5B, Y' indicates the output pixel value, Y the current pixel value, $\phi$ the dilation amount, and G the gain value.

As stated above, since pixel values of an input image signal are converted into appropriate output pixel values of an output signal by the above process, artifacts existing in the input image signal are suppressed.

Further, by applying dilation with respect to the local characteristics of an image signal, the present general inventive concept can reduce shoot artifacts occurring upon lossy compression of the image signal or while the image signal passes through bandwidth-limited transmission lines, and enhance a sharpness of an image represented by the image signal. Therefore, the present general inventive concept enables realistic and vivid images to be obtained by effectively enhancing the sharpness of the images.

Due to an application of dilation proportional to an edge size of the image, the present general inventive concept has an advantage of suppressing shoot artifacts and preventing components of detailed images that exist around edges of the detailed images from being removed.

Owing to a design of the dilation proportional to the edge size, the present general inventive concept can suppress shoot artifacts effectively since an entire region where shoot artifacts occur is taken into account.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to process shoot artifacts of an image signal in an image processing system, comprising:
   a maximum gradient value calculation part to set a window of a predetermined size based on a current pixel of an input image signal and to calculate a maximum gradient value based on values of pixels in the window;
   a limit value calculation part to calculate a limit value corresponding to the maximum gradient value;
   a dilation amount calculation part to calculate a dilation amount corresponding to the current pixel based on the calculated limit value and a pixel difference between the current pixel and neighboring pixels of the current pixel; and
   a pixel value conversion part to add a current pixel value of the current pixel to a value obtained by multiplying the calculated dilation amount by a predetermined gain value to determine an output value, and to output the output value.

2. The apparatus as claimed in claim 1, wherein the limit value is calculated based on an equation as below:

$$\sigma = k_1 D_{MAX}$$

where $\sigma$ indicates the limit value, $k_1$ an arbitrary constant, and $D_{MAX}$ the maximum gradient value.

3. The apparatus as claimed in claim 1, wherein the limit value is calculated based on an equation as below:

$$\sigma = K_2 (1 - \cos(2\pi f D_{MAX})),$$

where $\sigma$ indicates the limit value, $K_2$ and f arbitrary constants, respectively, and $D_{MAX}$ the maximum gradient value.

4. The apparatus as claimed in claim 1, wherein the dilation amount is calculated in an equation as below when a magnitude of the pixel difference is smaller than the calculated limit value:

$$\phi(x, \sigma) = x\left[1 - \left(\frac{x}{\sigma}\right)^2\right]^2,$$

where φ indicates the dilation amount, x the pixel difference, and σ the limit value.

5. The apparatus as claimed in claim 1, wherein the dilation amount is proportional to an edge size of the input image signal.

6. The apparatus as claimed in claim 1, wherein the gain value is adjustable by a user.

7. The apparatus as claimed in claim 1, wherein the maximum gradient value is calculated based on an equation as below:

$$D_{MAX} = \text{Max}(|P_0 - P_1|, |P_1 - P_2|, |P_2 - P_3|, 0, |P_{n-1} - P_n|)$$

where $D_{MAX}$ indicates the maximum gradient value, $P_0 \sim P_n$ the pixel values of the pixels in the window, and Max( ) a maximum-value function.

8. An image processing apparatus to suppress shoot artifacts of an input image signal, comprising:
 a calculation part to receive an input image signal having pixels with pixel values and representing an image, to calculate a maximum gradient value of a local area with respect each pixel of the input image signal, to calculate a limit value with respect to each pixel of the input image signal according to the respective maximum gradient value, and to calculate a dilation amount with respect to each pixel of the input image signal according to the respective limit value and a difference between the pixel values of each pixel and pixels neighboring each pixel of the input image signal; and
 a pixel value conversion part to convert the input image signal to an output image signal by adjusting the pixel value of each pixel of the input image signal according to the respective dilation amount and a predetermined gain value.

9. The image processing apparatus as claimed in claim 8, wherein the calculation part calculates the maximum gradient value of the local area with respect each pixel of the input image signal by calculating gradient values between neighboring pixels in the local area and selecting the greatest calculated gradient value.

10. The image processing apparatus as claimed in claim 8, wherein the calculation part calculates the limit value based on a linearly proportional relationship with the maximum gradient value.

11. The image processing apparatus as claimed in claim 8, wherein the calculation part calculates the limit value based on one of a sine-function relationship and a cosine-function relationship with the maximum gradient value.

12. The image processing apparatus as claimed in claim 8, wherein the image represented by the image input signal has an edge area, and the dilation amount is proportional to a size of the edge area.

13. The image processing apparatus as claimed in claim 8, wherein the calculation part comprises a low-pass filter, and calculates the dilation amount after passing the input image signal through the low pass filter.

14. The image processing apparatus as claimed in claim 13, wherein the calculation part controls the low-pass filter with respect to each pixel of the input image signal according to the respective calculated limit value.

15. The image processing apparatus as claimed in claim 14, wherein the calculation part controls the low-pass filter to have a bandwidth equal to the calculated limit value with respect to each pixel of the input image signal.

16. The image processing apparatus as claimed in claim 8, wherein the pixel value conversion part adds the pixel value of each pixel to a product of the respective dilation amount and the predetermined gain value.

17. An image processing apparatus to suppress shoot artifacts of an input image signal, comprising:
 a calculation part having a brightness deviation factor determination unit to determine a brightness deviation factor of a pixel of an input image signal with respect to a localized area surrounding the pixel, and a low-pass filter to filter the input image signal according to the determined brightness deviation factor and a difference between a value of the pixel and a value of at least one neighboring pixel to determine a dilation amount corresponding to the pixel; and
 a pixel value conversion part to adjust the value of the pixel according to the dilation amount, and output the adjusted value of the pixel.

18. The image processing apparatus as claimed in claim 17, wherein the brightness deviation factor determination unit calculates a maximum gradient value in the localized area surrounding the pixel and determines the brightness deviation factor based on the maximum gradient value.

19. The image processing apparatus as claimed in claim 18, wherein the brightness deviation factor is linearly proportional to the maximum gradient value.

20. The image processing apparatus as claimed in claim 18, wherein the brightness deviation factor is related to the maximum gradient value according to one of a sine function or a cosine function.

21. The image processing apparatus as claimed in claim 17, wherein the low-pass filter comprises a bandwidth equal to the brightness deviation factor.

22. The image processing apparatus as claimed in claim 17, wherein the pixel value conversion part adds the product of the dilation amount and the predetermined gain to the value of the pixel.

23. A method of processing shoot artifacts of an image signal, the method comprising:
 setting a window of a predetermined size based on a current pixel of an input image signal, and calculating a maximum gradient value based on values of pixels in the window;
 calculating a limit value corresponding to the maximum gradient value;
 calculating a dilation amount corresponding to the current pixel based on the calculated limit value and a pixel difference between the current pixel and neighboring pixels of the current pixel; and
 adding a current pixel value of the current pixel to a value obtained by multiplying the calculated dilation amount by a predetermined gain value.

24. The method as claimed in claim 23, wherein calculating of the maximum gradient value comprises:
 calculating pixel differences between neighboring pixels of plural pixels in the window; and
 selecting a maximum value of the calculated pixel differences.

25. The method as claimed in claim 23, wherein the limit value is calculated based on an equation as below:

$$\sigma = k_1 D_{MAX}$$

where σ indicates the limit value, $k_1$ an arbitrary constant, and $D_{MAX}$ the maximum gradient value.

26. The method as claimed in claim 23, wherein the limit value is calculated based on an equation as below:

$$\sigma = K_2(1 - \cos(2\pi f D_{MAX})),$$

where $\sigma$ indicates the limit value, $K_2$ and $f$ arbitrary constants, respectively, and $D_{MAX}$ the maximum gradient value.

27. The method as claimed in claim 23, wherein the dilation amount is calculated in an equation as below only when a magnitude of the pixel difference is smaller than the calculated limit value:

$$\phi(x, \sigma) = x\left[1 - \left(\frac{x}{\sigma}\right)^2\right]^2,$$

where $\phi$ indicates the dilation amount, $x$ the pixel difference, and $\sigma$ the limit value.

28. The method as claimed in claim 23, wherein the dilation amount is proportional to an edge size of the input image signal.

29. The method as claimed in claim 23, wherein the gain value is adjustable by a user.

30. A method of processing an input signal representing an image having a plurality of pixels, the method comprising:
   calculating a maximum gradient value corresponding to each of the plurality of pixels within an area of a predetermined size surrounding each of the plurality of pixels;
   calculating a limit value corresponding to each of the plurality of pixels based on the calculated maximum gradient value corresponding to each of the plurality of pixels;
   calculating a dilation amount corresponding to each of the plurality pixels based on the calculated limit amount of each of the plurality of pixels and a pixel value difference between each of the plurality of pixels and neighboring pixels of each of the plurality of pixels; and
   adjusting the pixel value of each of the plurality of pixels based on the calculated dilation amount corresponding to each of the of the plurality of pixels and a predetermined gain value.

31. The method as claimed in claim 30, wherein the calculating of the maximum gradient value corresponding to each of the plurality of pixels comprises:
   calculating pixel value differences between neighboring ones of the plurality of pixels within the area of the predetermined size surrounding each of the plurality of pixels; and
   selecting the maximum pixel value difference corresponding to the area of the predetermined size surrounding each of the plurality of pixels.

32. The method as claimed in claim 30, wherein the limit amount is linearly proportional to the maximum gradient value.

33. The method as claimed in claim 30, wherein the limit amount has a sine function or cosine function relationship with the maximum gradient value.

34. The method as claimed in claim 30, wherein the calculating of the dilation amount corresponding to each of the plurality of pixels comprises:
   low-pass filtering each of the plurality of pixels based on the calculated limit value corresponding to each of the plurality of pixels and the pixel value difference between each of the plurality of pixels and the neighboring pixels of each of the plurality of pixels when the pixel value difference between each of the plurality of pixels and the neighboring pixels of each of the plurality of pixels not larger than calculated limit value corresponding to each of the plurality of pixels.

35. The method as claimed in claim 34, wherein the calculating of the dilation amount corresponding to each of the plurality of pixels further comprises:
   calculating the dilation amount to be zero when the pixel value difference between each of the plurality of pixels and the neighboring pixels of each of the plurality of pixels is larger than the calculated limit value corresponding to each of the plurality of pixels.

36. The method as claimed in claim 30, wherein the adjusting of the pixel value of each of the plurality of pixels comprises:
   multiplying the calculated dilation amount corresponding to each of the plurality of pixels and the predetermined gain value to determine an adjustment value corresponding to each of the plurality of pixels; and
   adding the adjustment value corresponding to each of the plurality of pixels to the value of each of the plurality of pixels.

* * * * *